US009759815B2

(12) United States Patent
Basnayake (10) Patent No.: US 9,759,815 B2
(45) Date of Patent: Sep. 12, 2017

(54) ESTIMATION OF PRECISE ROAD GRADE USING TIME-DIFFERENCED SATELLITE NAVIGATION SYSTEM SIGNALS

(71) Applicant: GENERAL MOTORS LLC, Detroit, MI (US)

(72) Inventor: Chaminda Basnayake, Ruthven (CA)

(73) Assignee: General Motors LLC, Detroit, MI (US)

( * ) Notice: Subject to any disclaimer, the term of this patent is extended or adjusted under 35 U.S.C. 154(b) by 449 days.

(21) Appl. No.: 14/540,510

(22) Filed: Nov. 13, 2014

(65) Prior Publication Data

US 2016/0139272 A1 May 19, 2016

(51) Int. Cl.
G01S 19/14 (2010.01)
G01S 19/39 (2010.01)
G01S 19/43 (2010.01)

(52) U.S. Cl.
CPC .............. G01S 19/14 (2013.01); G01S 19/39 (2013.01); G01S 19/43 (2013.01)

(58) Field of Classification Search
CPC ....... G01S 19/35; G01S 19/14; H01L 23/645; H01L 24/14
USPC ....................................... 342/357.75, 357.52
See application file for complete search history.

(56) References Cited

U.S. PATENT DOCUMENTS 6,369,755 B1 * 4/2002 Nichols ............... G01C 15/002
342/357.52
6,424,914 B1 * 7/2002 Lin ...................... G01C 21/165
342/357.29
2010/0324752 A1 * 12/2010 Suganuma ............ B60W 40/06
701/1
2011/0267227 A1 * 11/2011 Dai ......................... G01S 19/54
342/357.27
2015/0293230 A1 * 10/2015 Weed ...................... G01S 19/04
342/357.41

OTHER PUBLICATIONS

Parviainen, Jussi, et al., "Barometer-Aided Road Grace Estimation", 6 pages, (Jan. 2011).
Part 1 of "Real-Time Kinematic Surveying Training Guide", Part No. 33142-40, Revision D, TRIMBL, 183 pages total, (Sep. 2003).
Part 2, "Real-Time Kinematic Surveying Training Guide", Part No. 33142-40, Revision D, TRIMBL, 185 pages total, (Sep. 2003).

* cited by examiner

Primary Examiner — Harry Liu
(74) Attorney, Agent, or Firm — Leydig, Voit & Mayer, Ltd.

(57) ABSTRACT

Implementations described herein contemplate measuring the carrier phase (CP) of carrier signals transmitted by constituent satellites of a Global Navigation Satellite System (GNSS) to provide highly accurate calculations of a gradient of a road segment between different points at which the vehicle received carrier signals (from which CP measurements were made). The methods described herein are able to calculate the road grade with only an approximate estimate of the absolute altitude of the receiver. Similarly, the methods described herein are able to provide a precise estimate of road grade with only an approximate estimate of the absolute value of latitude or longitude. Furthermore, implementations described herein provide highly accurate calculations of road grade information with standard GNSS vehicle hardware and are thereby able to achieve a substantial increase in accuracy without increasing cost.

20 Claims, 5 Drawing Sheets

(Prior Art)

ESTIMATION OF PRECISE ROAD GRADE USING TIME-DIFFERENCED SATELLITE NAVIGATION SYSTEM SIGNALS

TECHNOLOGY FIELD

The present disclosure relates generally to vehicular navigation systems and more specifically to calculating the gradient of a road segment traversed by a vehicle.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activated, telematics units can be utilized by a subscriber to obtain telematics services, such as those described herein, from the TSP.

One service provided by a TSP is Global Navigation Satellite System (GNSS) based navigation. GNSS is a generic term referring to any of multiple satellite constellation-based global positioning networks including, for example, the Global Positioning System (GPS) constellation. Another GNSS constellation network is the Global Navigation Satellite System (GLONASS). A particular example of GNSS based navigation services is the provision of turn-by-turn (TBT) directions from a current location of a vehicle (or from an alternative start location) to a specified destination location.

SUMMARY OF THE INVENTION

A method is provided herein for determining a gradient of a road segment traversed by a vehicle, for the method including receiving, by a transceiver located at the vehicle during a first epoch, at least four first carrier signals each transmitted by one of at least four satellite navigation system satellites, measuring a carrier phase (CP) of each of the at least four first carrier signals, storing the measured CP of each of the at least four carrier signals at processor readable media, receiving, by the transceiver during a second epoch, at least four second carrier signals each transmitted by one of the at least four satellite navigation system satellites, measuring a CP of each of the at least four second carrier signal, determining, for each of the at least four satellite navigation system satellites, a difference in the measured CP of the first carrier signal and the measured CP of the second carrier signal, providing, as an input into a change in carrier phase equation for each of the at least four satellite navigation system satellites, the difference in the measured CP of the first carrier signal and the measured CP of the second carrier signal for each of the at least four satellite navigation system satellites, obtaining a solution representing a change in location coordinates from the first epoch to the second epoch by solving a system of equations including the change in carrier phase equation of each of the at least four satellite navigation system satellites, and determining the gradient of the road segment from the solution.

A computer readable electronic storage medium is provided herein having stored thereon instructions for determining a gradient of a road segment traversed by a vehicle, the instructions providing for receiving, by a transceiver located at the vehicle during a first epoch, at least four first carrier signals each transmitted by one of at least four satellite navigation system satellites, measuring a carrier phase (CP) of each of the at least four first carrier signals, storing the measured CP of each of the at least four carrier signals at processor readable media, receiving, by the transceiver during a second epoch, at least four second carrier signals each transmitted by one of the at least four satellite navigation system satellites, measuring a CP of each of the at least four second carrier signal, determining, for each of the at least four satellite navigation system satellites, a difference in the measured CP of the first carrier signal and the measured CP of the second carrier signal, providing, as an input into a change in carrier phase equation for each of the at least four satellite navigation system satellites, the difference in the measured CP of the first carrier signal and the measured CP of the second carrier signal for each of the at least four satellite navigation system satellites, obtaining a solution representing a change in location coordinates from the first epoch to the second epoch by solving a system of equations including the change in carrier phase equation of each of the at least four satellite navigation system satellites, and determining the gradient of the road segment from the solution.

A system is provided herein for determining the gradient of a road traversed by a vehicle from a first time to a second time, the system comprising a receiver, configured to receive at least four first carrier signals each transmitted by one of at least four satellite navigation system satellites, and receive at least four second carrier signals each transmitted by one of the at least four satellite navigation system satellites, a processor readable memory, configured to store a measured carrier phase (CP) value of each of the at least four first carrier signals, and store a measured CP value of each of the at least four second carrier signals, and a processor, configured to measure a CP of each of the at least four first carrier signals, measure a CP of each of the at least four second carrier signal, determine, for each of the at least four satellite navigation system satellites, a difference in the measure CP of the first carrier signal and the measured CP of the second carrier signal, provide the difference in the measure of the CP of the first carrier signal and measure of the second carrier signal for each of the at least four satellite navigation system satellites as an input into a change in carrier phase equation corresponding to each of the at least four satellite navigation system satellites, obtain a solution representing a change in location coordinates from the first time to the second time by solving a system of equations created from the equations corresponding to each of the at least four satellite navigation system satellites, and determine the gradient of the road segment from the solution representing the change in location coordinates from the first time to the second time.

BRIEF DESCRIPTION OF THE DRAWINGS

While the appended claims set forth the features of the invention with particularity, the invention, together with its objects and advantages, may be best understood from the following detailed description taken in conjunction with the accompanying drawings of which:

DETAILED DESCRIPTION OF THE DRAWINGS

Implementations described herein contemplate measuring the carrier phase (CP) of carrier signals transmitted by constituent satellites of a Global Navigation Satellite System (GNSS) at multiple points in time in order to determine a change in the position of a vehicle at which the carrier signals are received. Implementation described herein also contemplate utilizing the CP measurement in order to provide highly accurate calculations of a gradient of a road segment between different points at which the vehicle received carrier signals (from which CP measurements were made). By utilizing CP measurements to calculate the grade of a road segment between two different points, implementations described herein achieve gradient values for road segments that are considerable more accurate than the gradient values provided by prior art systems and processes. Specifically, the residual error contained in the calculations of a grade of a road provided by the implementations described herein is an order of magnitude less than the residual error contained in the calculations of road grade provided by prior art systems and methods for determining the grade of a road. The methods described herein are also able to calculate the road grade with only an approximate estimate of the absolute altitude of the receiver. Similarly, the methods described herein are able to provide a precise estimate of road grade with only an approximate estimate of the absolute value of latitude or longitude. Furthermore, implementations described herein provide highly accurate calculations of road grade information with standard GNSS vehicle hardware and are thereby able to achieve a substantial increase in accuracy without increasing cost.

Common prior art methods of estimating the gradient of a road traversed by a vehicle provide estimates exhibiting a residual error that can be significant for certain applications. A first common prior art method calls for using a vehicle's GNSS hardware to measure the absolute height of the vehicle and for calculating a gradient of a road segment from the measured values of absolute height and from other measurements made by the vehicle, e.g. time measurements, vehicle speed measurements, and measurements of the vehicle's latitude and longitude. However, measurements of the absolute height of a vehicle obtained with GNSS hardware exhibit relatively large residual errors as a result of noise in the absolute height measurements taken by the vehicle's Satellite navigation component (absolute height data obtained with GNSS hardware is approximately three times as noisy as absolute latitude and longitude data obtained with GNSS hardware).

A second common prior art method utilizes preexisting relationships between points specified by specific latitude and longitude values and absolute height data. Similar prior art methods utilize preexisting relationships between points specified by specific latitude and longitude values and data indicative of the gradient of a road at such specified points. Such common prior art methods identify a point at which the vehicle is located based on the latitude and longitude values obtained by the GNSS hardware and look up a value of the gradient of a road located at that point, e.g., in a relationship table or a digital map. However, such relationships are not always readily available if they are available at all and therefore such methods cannot reliable determine the gradient of road segments as gradient data is not available for many segments. Moreover, maintaining such relationship data necessitates the build out and maintenance of an extensive data storage infrastructure (which entails significant costs), and disseminating such information occupies limited communications bandwidth (thereby also entailing significant costs).

Implementations described herein contemplate providing precise road grade information with standard GNSS vehicle hardware. Specifically, implementations described herein involve receiving carrier signals transmitted by constituent satellites of a GNSS over a period of time, acquiring carrier phase (CP) measurements from the received carrier signals, and maintaining a data buffer of the acquired CP measurements. Each CP measurement is a measurement of a range between a GNSS satellite and a GNSS receiver, e.g. an antenna located in the vehicle, as expressed in units of signal frequency cycles. CP measurements can include an ambiguous number of cycles that will remain fixed while tracking of a particular satellite signal is uninterrupted. In other words, when a signal loss and reacquisition occur, the ambiguous number of carrier cycles may differ from the ambiguous number of carrier cycles included in the CP measurements prior to the reacquisition. CP measurements can be made with a high degree of accuracy, e.g. the residual error of CP measurements made by GNSS hardware is on the order of millimeters. In other words, CP measurements are characterized by a considerably lower level of noise than are pseudorange measurements typically obtained with GNSS hardware.

Implementations further involve comparing CP measurements stored in the data buffer with consecutively received (or non-consecutively received) CP measurements of GNSS carrier signals that are also stored in the data buffer. The gradient of a road traversed by a vehicle can be estimated with a high degree of accuracy by using the difference in position between two points as indicated by consecutively received GNSS CP measurements. Implementations described herein calculate the gradient of a road traversed by a vehicle with a high degree of accuracy by comparing a CP measured from a carrier signal received at a first point in time with a CP measured from a carrier signal received at a different point in time.

Implementations of the invention may also contemplate utilizing the communicative connections between a telematics service provider (TSP) and a telematics unit in a vehicle to upload information pertaining to road grade to the TSP and to download information pertaining to road grade to the telematics unit. For example, a telematics unit in a vehicle may utilize information provided by a GNSS to calculate the grade of a road that the vehicle is presently traversing. The telematics unit may thereafter upload the calculated road grade, the information transmitted by the GNSS, or a combination thereof to the TSP. Alternatively, the telematics unit may download the road grade information pertaining to a road segment the vehicle is about to traverse from the TSP.

Information pertaining to the gradient of a road being traversed by a vehicle can be utilized for a variety of purposes. For example, road grade information can be utilized to optimize the vehicle drivetrain's gear ratio in order to maximize fuel economy, to maximize performance, or to maximize a metric combining different features. The increased accuracy of the measurements of the gradient of a road achieved through implementations of the present invention can yield increased degrees of optimization by the vehicle.

Road grade information can also be utilized to initialize certain vehicular features when certain circumstances are detected or to optimize the settings of various vehicular control systems. An electronic control unit (ECU) in a vehicle may monitor the gradient of a road that the vehicle is presently traversing. Upon encountering segments of road where the gradient exceeds a particular threshold, the ECU may mandate that particular action be taken. Similarly, a traction control system (TCS) or a brake control module (BCM) could be instructed to enter a particular mode in response to particular road grade information. For example, the ECU may cause a BCM to implement a steep road mode or specify that a TCU select a particular gear, lock the transmission into a particular gear, or implement some other control procedure. Furthermore, road grade information can be utilized to develop a prospective automatic shift schedule for a vehicle that is about to traverse a route for which road grade information is available. The increased accuracy of the measurements of the gradient of a road achieved through implementations described herein can ensure that such measures are employed with enhanced fidelity.

Figure 1:
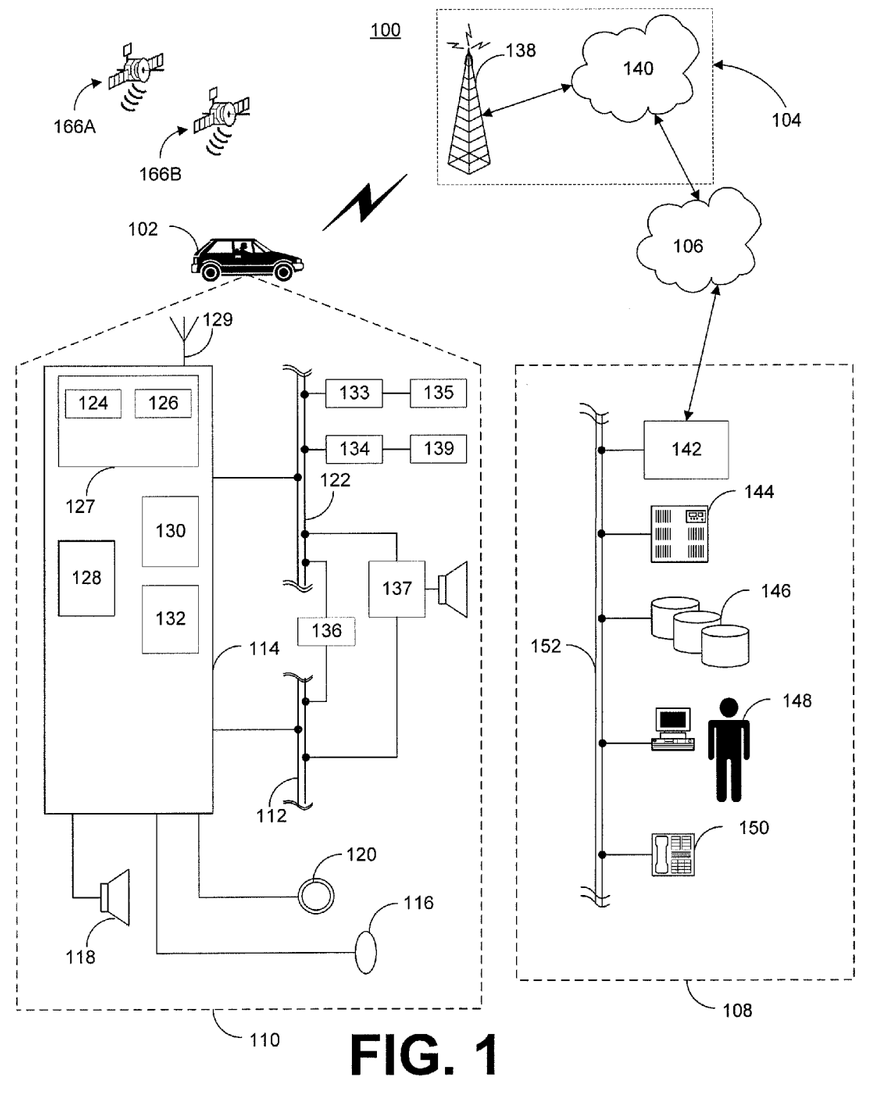
FIG. 1 is a schematic diagram of an operating environment for a mobile vehicle communication system usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present implementations and generally includes a vehicle 102, a wireless wide area network (WWAN) 104, a land network 106, and an operations control center (OCC) 108 of a telematics service provider (TSP). The vehicle 102 includes a satellite navigation component 132 for determining the location of the vehicle. It should be appreciated that the overall architecture, setup and operation, as well as the individual components of a system such as that shown in FIG. 1 are generally known in the art. Thus, the following paragraphs provide a brief overview of one such example communication system 100. However, implementations could be carried out in other environments as well.

Vehicle 102 is a mobile vehicle such as a motorcycle, car, truck, recreational vehicle (RV), boat, plane, etc., and is equipped with suitable hardware and software that enables it to communicate over the communication system 100. The vehicle 102 includes vehicle hardware 110 that, as shown generally in FIG. 1, includes a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device capable of providing a variety of services through its communicative connection with the OCC 108 and generally includes an electronic processing device 128 that may include one or more application processors that each includes one or more processor cores, one or more types of electronic memory 130, a mobile wireless component 124, a wireless modem 126, a multi-mode antenna 129 (e.g. a radio frequency transceiver), and a navigation unit containing a satellite navigation component 132. The satellite navigation component 132 is capable of determining the location of the vehicle with a high degree of accuracy. In one example, the wireless modem 126 comprises, and is carried out in the form of, a computer program and/or set of software routines executing within the electronic processing device 128. Alternatively, the wireless modem 126 comprises, and is carried out in the form of, a set of computer executable instructions stored at and carried out by the mobile wireless component 124. The mobile wireless component 124 and the wireless modem 126 may be called the network access device (NAD) 127 of the telematics unit 114.

The telematics unit 114 provides a variety of services for subscribers. Examples of such services include airbag deployment notification and other emergency or roadside assistance-related services provided in connection with various crash and or collision sensor interface modules 133 and sensors 135 located throughout the vehicle. Other example services include GNSS-based mapping/location identification, turn-by-turn directions, and other navigation-related services provided in conjunction with the satellite navigation component 132. GNSS-based services rely on communication between the vehicle 102 and GNSS satellites 166A and 166B.

GNSS navigation services are, for example, implemented based on geographic position information of the vehicle provided by the satellite navigation component 132. A user of the telematics unit 114 enters destination information, for example, and a route to a destination may be calculated based on the destination information and a current position of the vehicle determined by the satellite navigation component 132 at approximately the time of route calculation. Turn-by-turn (TBT) directions may further be provided on a display screen corresponding to the satellite navigation component 132 and/or through vocal directions provided through a vehicle audio component 137. The route calculation related processing may be performed at the telematics unit 114 or may be performed at the communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback. The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the WWAN 104 so that voice and/or data transmissions occur over the communications channel. Vehicle communications are enabled via the mobile wireless component 124 for voice communications and a wireless modem 126 for data transmission. For example, data pertaining to the gradient of a road traversed by the vehicle 102 can be transmitted by the telematics unit 114 to the OCC 108 via the dual-function antenna 129. Similarly, data pertaining to the gradient of a road segment included in TBT directions may be transmitted to the telematics unit 114 by the communication center 108 via the dual-function antenna 129.

To enable successful data transmission over the communications channel, wireless modem 126 applies some form of encoding or modulation to convert the digital data so that it can communicate through a vocoder or speech codec incorporated in the mobile wireless component 124. Any suitable encoding or modulation technique that provides an acceptable data rate and bit error can be used with the present method. The multi-mode antenna 129 services the satellite navigation component 132 and the mobile wireless component 124. The multi-mode antenna may be support GNSS communications, cellular communications, and other communications, e.g. Dedicated Short Range Communications (DSRC).

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the communication center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the OCC 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to communication center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The WWAN 104 can be a cellular telephone system or any other suitable wireless system that transmits signals between the vehicle hardware 110 and the land network 106. According to an example, the WWAN 104 includes one or more cell towers 138, base stations and/or mobile switching centers (MSCs) 140, as well as any other networking components required to connect the WWAN 104 with the land network 106. The mobile switching center may include a remote data server.

As appreciated by those skilled in the art, various cell tower/base station/MSC arrangements are possible and could be used with the WWAN 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The OCC 108 of the telematics service provider is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. Although the illustrated example has been described as it would be used in conjunction with a manned call center, it will be appreciated that the OCC 108 can be any central or remote facility, manned or unmanned, mobile or fixed, to or from which it is desirable to exchange voice and data.

The various components of the OCC 108 are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system and so that data transmissions are passed on to a modem or other piece of telecommunication and computer equipment 150 for demodulation and further signal processing. The telecommunication and computer equipment 150 includes a modem that preferably includes an encoder, as previously explained, and can be connected to various devices such as the servers 144 and the databases 146. The telecommunication and computer equipment 150 includes hardware that provides a means by which the servers 144 can access the databases 146 in order to request information from the databases 146. The servers 144 include a number of processors as well as computer readable storage media that have stored thereon processer executable instructions that provide routines that are specified by one or more server-side applications. The databases 146 include a number of high capacity electronic storage devices that may include RAM, ROM, PROM, volatile, nonvolatile, or other electronic memory. The databases 146 are configured to store subscription records and any other pertinent subscriber information.

In general terms, not intended to limit the claims, the example environment depicted by FIG. 1 may be used by systems and methods that measure the carrier phase (CP) of carrier signals transmitted by constituent satellites of a Global Navigation Satellite System (GNSS) during multiple periods in time in order to determine a change in the position of a vehicle at which the carrier signals are received. Implementations described herein contemplate utilizing the CP measurement in order to provide highly accurate calculations of a gradient of a road segment between different points at which the vehicle received carrier signals (from which CP measurements were made). Specifically, implementations described herein involve receiving carrier signals transmitted by constituent satellites of a GNSS over a period of time, acquiring carrier phase (CP) measurements from the received carrier signals, and maintaining a data buffer of the acquired CP measurements. Implementations further involve comparing CP measurements stored in the data buffer with consecutively received (or non-consecutively received) CP measurements of GNSS carrier signals that are also stored in the data buffer. The gradient of a road traversed by a vehicle can be estimated with a high degree of accuracy by using the difference in carrier signals and thereby difference in position between two points as indicated by GNSS CP measurements made from GNSS carrier signals received at different points in space.

Figure 2:
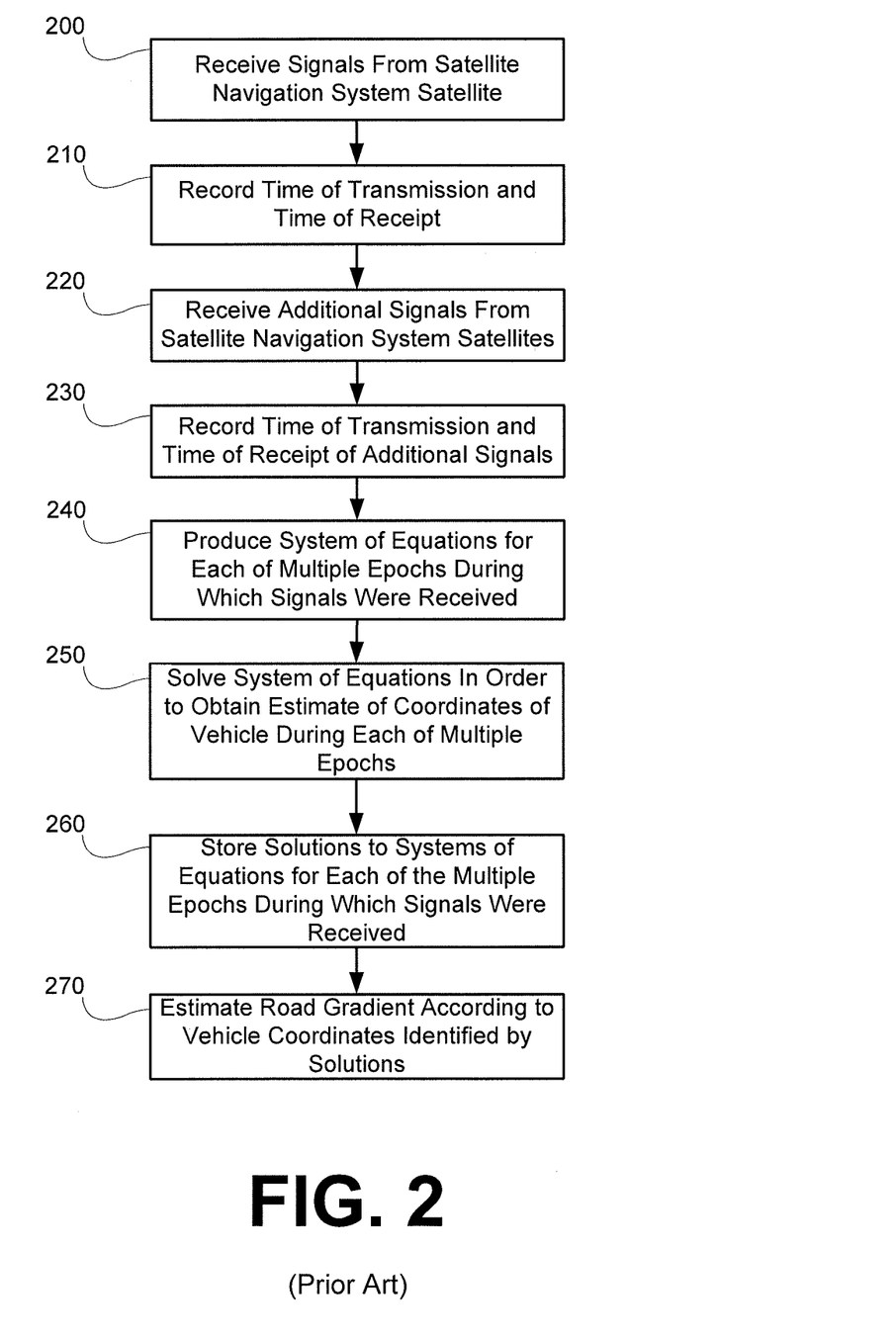
FIG. 2 is a flow diagram illustrating a prior art process implemented by a telematics unit of a vehicle for estimating the gradient of a road segment traversed by a vehicle.

FIG. 2 is a flow diagram illustrating a prior art process implemented by a telematics unit of a vehicle for estimating the gradient of a road segment traversed by the vehicle. In the prior art process illustrated by the flow diagram of FIG. 2, the satellite navigation component 132 of the telematics unit 114 of the vehicle 102 estimates the pseudorange from the multi-mode antenna 129 of the vehicle to each of multiple constituent satellites of a GNSS, e.g. the satellites 166A and 166B, during each of multiple different epochs (which ideally have a very short duration, and in particular, a duration that is very short as compared with the duration of the time interval between consecutive epochs). In order to estimate the pseudorange, the satellite navigation component 132 uses the following equation:

$$\rho_i = (R_i + cT_{user} + \delta\rho_i)$$

Where $\rho_i$ is the pseudorange to the ith satellite as measured by the satellite navigation component 132 (i.e. the receiver), $R_i$ is the geometric range to the ith satellite, c is the speed of light, $T_{user}$ is the error of a clock used by the satellite navigation component to measure the time at which a signal is received, and $\delta\rho_i$ is the residual pseudorange error for the ith satellite, which contains satellite errors (e.g. clock and orbital errors), atmospheric errors (e.g. delay caused by the troposphere and ionosphere), and measurement noise (which can include possible multipath measurement noise).

Thereafter, for each of the multiple epochs, the satellite navigation component 132 uses the pseudorange measurements corresponding to that epoch to estimate the coordinates of the vehicle 102 during the epoch. Finally, the satellite navigation component 132 of the telematics unit 114 estimates the gradient of a road segment traversed by the vehicle 102 during a time period between consecutive epochs by calculating the gradient of a line between the coordinates at which the vehicle was located at each of the consecutive epochs.

At 200, the satellite navigation component 132 receives, from each of multiple constituent satellites of a GNSS during a first epoch, a signal that specifies a time of transmission, and records, for each signal transmitted by a constituent satellite, the time (as measured by a clock located at the vehicle 102) at which the signal was received. At step 210, the satellite navigation component 132 records, for each signal transmitted by a constituent satellite at computer readable media such as the electronic memory 130, a pair of values that includes the time of transmission specified by the signal and the time at which the signal was received.

At 220, the satellite navigation component 132 receives, during each of one or more subsequent epochs, a signal that specifies a subsequent time of transmission from each of multiple constituent satellites of a GNSS, and records, for each signal transmitted by a constituent satellite, a subsequent time (as measured by a clock located at the vehicle 102) at which the signal was received. At step 230, the satellite navigation component 132 records, at computer readable media such as the electronic memory 130, a pair of values for each signal received in each of the one or more subsequent epochs that includes the time of transmission specified by the signal and the time at which the signal was received.

At 240, the satellite navigation component 132 produces a system of equations for each epoch, where each equation in each system specifies a pseudorange from a constituent satellite of the GNSS to the vehicle 102 during the epoch. In order to produce a system of equations for each epoch, the satellite navigation component 132 utilizes the data pairs that were stored at each of 210 and 230, which have the form $(T_{R,i}, T_{T,i})$ where $T_{R,i}$ is the time of reception of the signal from the ith satellite and $T_{T,i}$ is the time of transmission of the signal as indicated by the ith satellite, and the approximate identity:

$$\rho_i = c(T_{R,i} - T_{T,i})$$

which equates the psuedorange, $\rho_i$, with the speed of light c multiplied by the time the signal takes to travel from the ith satellite to the vehicle 102, i.e. $T_{R,i} - T_{T,i}$. In order to determine a geographic location corresponding to each of the epochs, the preceding two equations are utilized in conjunction with the identity:

$$R_i = \sqrt{(X_{user} - X_i)^2 + (Y_{user} - Y_i)^2 + (Z_{user} - Z_i)^2}$$

For each satellite, the values of $(X_i, Y_i, Z_i)$ can be obtained using the World Geodetic System 1984 (WGS84) coordinates. After acquiring the values of $(X_i, Y_i, Z_i)$ for each satellite from which a signal was received during each of the epochs at steps 200 and 220, an equation having four unknowns can be written as:

$$c(T_{R,i} - T_{T,i}) = \sqrt{(X_{user} - X_i)^2 + (Y_{user} - Y_i)^2 + (Z_{user} - Z_i)^2} + cT_{user} + \delta\rho_i$$

If the receiver is able to measure a pseudorange to each of at least four satellites during each epoch, the system of equations can be solved in order to yield coordinates for the geographic position of the vehicle during each of the epochs.

At 250, the satellite navigation component solves the system of equations for each epoch in order to yield a solution of the form $(X_{user}, Y_{user}, Z_{user}, T_{user})$. At 260, the satellite navigation component stores the solution to the system of equations created for each epoch at 240. At 270, the satellite navigation component 132 estimates a gradient for the road segment located between points at which the vehicle was located during each of various epochs. The gradient is determined to be the ratio of the change in height from a point at which the vehicle was located during a first epoch to a point at which the vehicle was located during a second epoch to the square root of the sum of the squares of the change in latitudinal and longitudinal distances from a point at which the vehicle was located during the first epoch to a point at which the vehicle was located during the second epoch. Expressed mathematically, road grade is determined to be $$g = \frac{\Delta h}{\sqrt{\Delta\varphi^2 + \Delta\lambda^2}},$$

wherein $\Delta h$ is the change in height, $\Delta\varphi$ is the change in latitudinal distance, and $\Delta\lambda$ is the change in longitudinal distance.

Figure 3:
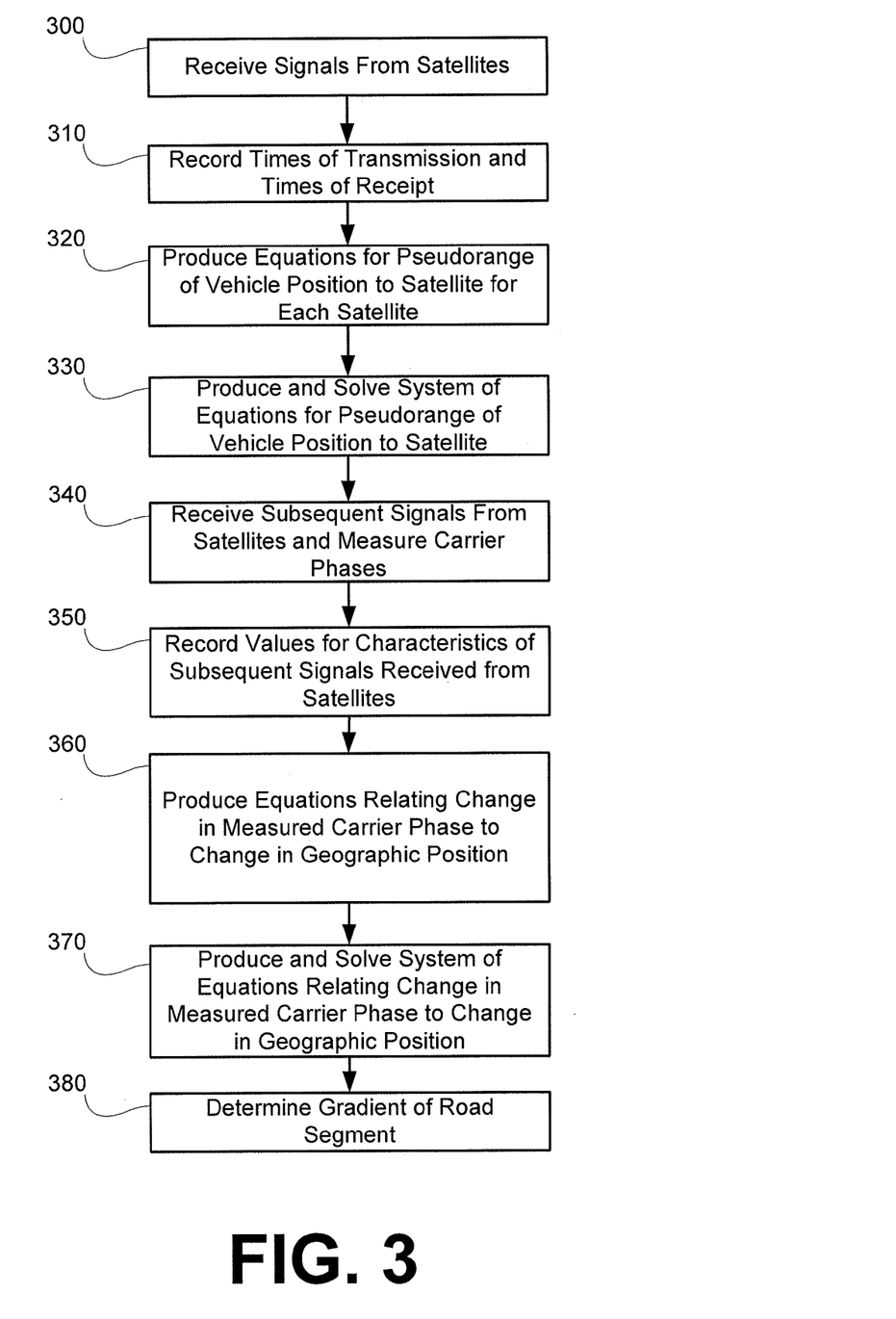
FIG. 3 is a flow diagram illustrating a process implemented by a telematics unit of a vehicle for using carrier phase measurements to calculate the gradient of a road segment traversed by a vehicle.

FIG. 3 is a flow diagram illustrating a process implemented by a telematics unit of a vehicle for using carrier phase measurements to calculate the gradient of a road segment traversed by the vehicle. At 300, the satellite navigation component 132 receives, during epoch j, a signal that specifies a time of transmission from each of multiple constituent satellites of a GNSS, and records, for each signal transmitted by a constituent satellite, the time (as measured by a clock located at the vehicle 102) at which the signal was received.

At 310, the satellite navigation component 132 records, at computer readable media such as the electronic memory 130, a pair of values for each ith satellite that transmitted a signal that was received by the satellite navigation component 132 at 300. Each pair includes a time of transmission specified by the signal and a time at which the signal was received as measured by the satellite navigation component 132. In particular, for each constituent satellite from which a signal was received at 300, a data structure having the form $(T_{R,i,j}, T_{T,i,j})$, where $T_{R,i,j}$ is the time of reception of the signal from the ith satellite and $T_{T,i,j}$ is the time of transmission of the signal as indicated by the signal, is recorded at 310.

At 320, the satellite navigation component 132 produces, for each constituent satellite from which a signal received by the satellite navigation component 132 at 300, an equation of the form:

$$c(T_{R,i,j} - T_{T,i,j}) = \sqrt{(X_{user,j} - X_{i,j})^2 + (Y_{user,j} - Y_{i,j})^2 + (Z_{user,j} - Z_{i,j})^2} + cT_{user,j} + \delta\rho_{i,j}$$

where $c(T_{R,i,j} - T_{T,i,j})$ is the pseudorange from the vehicle to the ith satellite during epoch j, c is the speed of light, $T_{R,i,j} - T_{T,i,j}$ is the time the signal takes to travel from the ith satellite to the vehicle 102, $$R_{i,j} = \sqrt{(X_{user,j} - X_{i,j})^2 + (Y_{user,j} - Y_{i,j})^2 + (Z_{user,j} - Z_{i,j})^2}$$

is the geometric range from the vehicle to the ith satellite, the values $(X_{i,j}, Y_{i,j}, Z_{i,j})$ are WGS84 coordinates of the ith satellite at the time $T_{T,i,j}$ (which can be obtained from tables that correlate the locations of GNSS satellites to times $T_{T,i,j}$), the values $(X_{user,j}, Y_{user,j}, Z_{user,j})$ are WGS 84 coordinates of the vehicle 102 during epoch j, $T_{user,j}$ is the error (during epoch j) of a clock, used by the satellite navigation component 132 to measure $T_{R,i,j}$, and $\delta\rho_{i,j}$ is the residual pseudorange error for the ith satellite during epoch j, which contains satellite errors (e.g. clock and orbital errors), atmospheric errors (e.g. delay caused by the troposphere and ionosphere), and measurement noise.

At 330, the satellite navigation component 132 produces and solves a system of equations in order to obtain estimates for the values $(X_{user,j}, Y_{user,j}, Z_{user,j}, T_{user,j})$ that correspond to the epoch j during which the signals were received at 300. The system of equations produced by the process at 330 is composed of at least four equations of the form produced at 320 for each of at least 4 different satellites.

At 340, the satellite navigation component 132 receives, during epochs denoted j+1 and j+2, a signal from each of multiple constituent satellites of a GNSS, and records, for each signal transmitted by a constituent satellite, the time (as measured by a clock located at the vehicle 102) at which the signal was received. Furthermore, the process also measures, for each of the multiple constituent satellites from which the satellite navigation component 132 received a signal during each epoch j+1 and j+2, a CP measurement.

At 350, the satellite navigation component 132 records, for each epoch j+1 and j+2 at computer readable media such as the electronic memory 130, a pair of values for each ith satellite that transmitted a signal that was received by the satellite navigation component 132 during epochs j+1 and j+2 at 340. Each pair of values includes a time at which the signal was received as measured by the satellite navigation component 132 and a CP of the received signal. In particular, for each constituent satellite from which a signal was received at 340, a data structure for epoch j+1 having the form $(T_{R,i,j+1}, \lambda\phi_{i,j+1})$, where $T_{R,i,j+1}$ is the time of reception of the signal from the ith satellite and $\lambda\phi_{i,j+1}$ is the CP of the signal, and a data structure for epoch j+2 having the form $(T_{R,i,j+2}, \lambda\phi_{i,j+2})$, where $T_{R,i,j+2}$ is the time of reception of the signal from the ith satellite and $\lambda\phi_{i,j+2}$ is the CP of the signal, are recorded at 350.

At 360, the satellite navigation component 132 produces, for each constituent satellite from which signals were received at both 300 and 340, an equation of the form:

$$\lambda\phi_{i,j+1} - \lambda\phi_{i,j+2} = R_{i,j+1} - R_{i,j+2} + c(T_{User,j+1} - T_{User,j+2}) + \lambda\delta\phi_{i,j+1} - \lambda\delta\phi_{i,j+2}$$

where $\lambda\phi_{i,j+1} = R_{i,j+1} + cT_{User,j+1} + \lambda\delta\phi_{i,j+1} + \lambda N_i$ is the CP of the signal received from the ith satellite during epoch j+1, $R_{i,j+1}$ is the geometric range between the vehicle 102 and the ith satellite at the time the signal was received from the ith satellite during epoch j+1, $cT_{User,j+1}$ is the error, during epoch j+1, of the clock utilized by the satellite navigation component 132 to measure the time at which signals are received, $\lambda\delta\phi_{i,j+1}$ is the is the carrier wavelength multiplied by the residual error in the CP of the signal received from the ith satellite during epoch j+1 (which includes satellite errors, e.g. clock and orbital errors, atmospheric errors, e.g. delay caused by the troposphere and ionosphere, multipath errors, and measurement noise), and $\lambda N_i$ is the carrier phase cycle ambiguity term (which remains constant so long as the telematics unit 114 maintains a connection with the ith satellite during a time interval including epochs j, j+1, and j+2). Similarly, $\lambda\phi_{i,j+2} = R_{i,j+2} + cT_{User,j+2} + \lambda\delta\phi_{i,j+2} + \lambda N_i$ is the CP of the signal received from the ith satellite during epoch j+2, $R_{1,j+2}$ is the geometric range between the vehicle 102 and the ith satellite at the time the signal was received from the ith satellite during epoch j+2, $cT_{User,j+2}$ is the error, during epoch j+2, of the clock utilized by the satellite navigation component 132 to measure the time at which signals are received, $\lambda\delta\phi_{i,j+2}$ is the is the carrier wavelength multiplied by the residual error in the CP of the signal received from the ith satellite during epoch j+2 (which includes satellite errors, e.g. clock and orbital errors, atmospheric errors, e.g. delay caused by the troposphere and ionosphere, multipath errors, and measurement noise), and $\lambda N_i$ is the carrier phase cycle ambiguity term (which remains constant so long as the telematics unit 114 maintains a connection with the ith satellite during a time interval including epochs j, j+1, and j+2).

At 370, the satellite navigation component 132 produces and solves a system of equations in order to obtain estimates for the values $(X_{user,j+1} - X_{user,j+2}, Y_{user,j+1} - Y_{user,j+2}, Z_{user,j+1} - Z_{user,j+2}, T_{user,j+1} - T_{user,j+2})$ that correspond to the change in the position of the vehicle between epochs j+1 and j+2. The system of equations produced by the process at 370 is composed of at least four equations of the form $\lambda\phi_{i,j+1} - \lambda\phi_{i,j+1+2} = R_{i,j+1} - R_{i,j+2} + c(T_{User,j+1} - T_{User,j+2}) + \lambda\delta\phi_{i,j+1} - \lambda\delta\phi_{i,j+2}$ into which the identities:

$$R_{i,j+1} = \sqrt{(X_{user,j+1} - X_{i,j+1})^2 + (Y_{user,j+1} - Y_{i,j+1})^2 + (Z_{user,j+1} - Z_{i,j+1})^2}$$

and $$R_{i,j+2} = \sqrt{(X_{user,j+2} - X_{i,j+2})^2 + (Y_{user,j+2} - Y_{i,j+2})^2 + (Z_{user,j+2} - Z_{i,j+2})^2}$$

are used (along with a value of $\lambda\delta\phi_{i,j+1} - \lambda\delta\phi_{i,j+2}$ that is calculated using data and information obtained at 300 through 330, e.g. the data structures having the form $(T_{R,i,j}, T_{T,i,j})$ stored at 310) in order to provide equations having unknown variables of the form $X_{user,j+1} - X_{user,j+2}$, $Y_{user,j+1} - Y_{user,j+2}$, and $Z_{user,j+1} - Z_{user,j+2}$. If a sufficient number of values of the quantity $\lambda\phi_{i,j+1} - \lambda\phi_{i,j+2}$ can be determined from the data stored at 310 and 350, the system of equations can be solved and a solution of the form $(X_{user,j+1} - X_{user,j+2}, Y_{user,j+1} - Y_{user,j+2}, Z_{user,j+1} - Z_{user,j+2}, T_{user,j+1} - T_{user,j+2})$ can be obtained.

At 380, the satellite navigation component 132 determines the gradient of a road segment traversed by a vehicle during a time interval beginning during epoch j+1 and ending during epoch j+2 according to the solution to the system of equations produced at 370.

In some implementations, the epoch j and the epoch j+1 may overlap or be identical. Therefore, in some implementations, the signals received at 300 during epoch j and the signals received at 340 during epoch j+1 may be the same signals. In other words, the values stored in the data pairs of the form $(T_{R,i,j}, T_{T,i,j})$ at 310 and the values stored in the data pairs of the form $(T_{R,i,j+1}, \lambda\phi_{i,j+1})$ at 340 may, in some implementations, be obtained from the same signals. Similarly, in some implementations, the process elements described in 300 to 330 may be repeated for the epoch j+2. In other words, a second set of values stored in data pairs $(T_{R,i,j+2}, T_{T,i,j+2})$ may be obtained. In such implementations, the values stored in the data pairs $(T_{R,i,j+2}, T_{T,i,j+2})$ may be used to estimate the errors $\lambda\delta\phi_{i,j+1} - \lambda\delta\phi_{i,j+2}$ at 370.

Implementations of the invention contemplate that the satellite navigation system that includes the satellite from which the carrier signal is received has global coverage. In such implementations, the satellite navigation system can be referred to as a global navigation satellite system (GNSS). Examples of a GNSS include the United States NAVSTAR Global Positioning System (GPS), the Russian GLONASS, and the European Galileo positioning system. Alternative implementations of the invention contemplate that the satellite navigation system that includes the satellite from which the carrier signal is received do not have global coverage. In some such implementations, the satellite navigation system may be referred to as a regional navigation satellite system. An example of a regional navigation satellite system is the Beidou navigation system (which is presently in the ongoing process of being converted into the Compass GNSS). The individual satellites from which the carrier signal is received may be, for example, a medium Earth orbit (MEO) satellite. The individual satellites from which the carrier signal is received may also be located in one of a number of different orbital planes.

The carrier signal transmitted by the satellite navigation system satellite may be a radio frequency (RF) signal in the L-band. For example, the RF signals may be centered at frequencies of 1176.45 MHz (L5), 1227.60 MHz (L2), 1381.05 MHz (L3), and 1575.42 MHz (L1). The RF carrier signal may be modulated by a pseudorandom noise (PRN) code. PRN codes may include but are not limited to Gold codes. A carrier signal that is modulated by a PRN code can be expressed as a linear combination of sinusoids.

Implementations of the invention contemplate measuring the CP of the carrier signal can be performed by utilizing the Doppler frequency of the carrier signal, e.g. by integrating the Doppler frequency, while alternative implementations of the invention contemplate measuring the CP of the carrier signal by utilizing a phase-locked loop.

Figure 4:
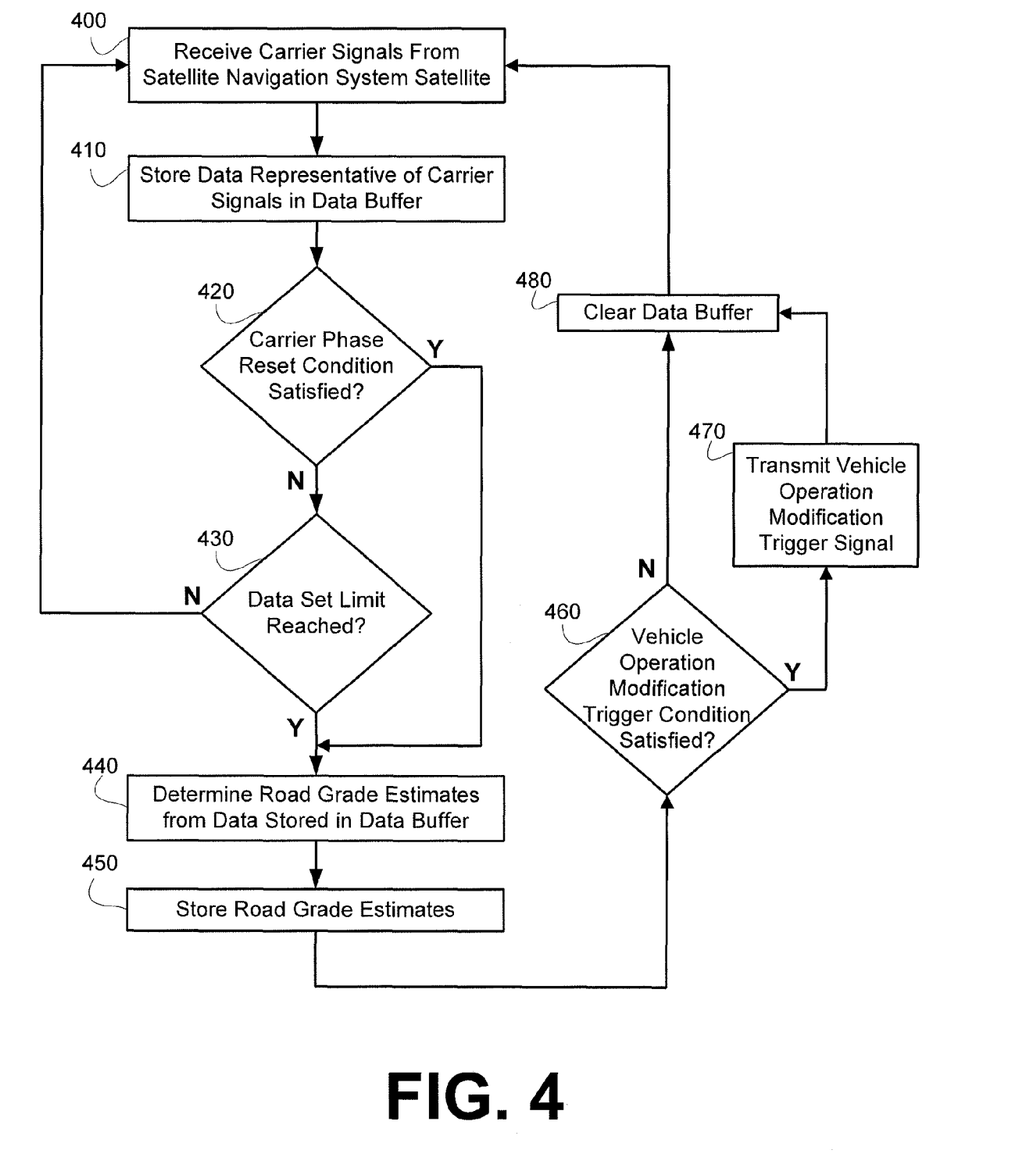
FIG. 4 is a flow diagram illustrating a process implemented by a telematics unit of a vehicle for estimating the grade of multiple segments of road traversed by a vehicle and for storing road grade data at computer readable media.

FIG. 4 is a flow diagram illustrating a process implemented by a telematics unit of a vehicle for estimating the grade of multiple segments of road traversed by the vehicle and for storing road grade data at computer readable media. Implementations of the invention contemplate that determinations made in the process depicted in FIG. 4 are made by the electronic processing system 128 of the telematics unit, by the satellite navigation component 132, or by a combination thereof.

At 400, the process receives GNSS carrier signals from multiple constituent satellites of the GNSS. Implementations contemplate that the process depicted in FIG. 4 involves the reception of GNSS carrier signals (which are modulated so as to carry navigation information from which pseudoranges to satellites and additional navigation information may be calculated) by the multi-mode antenna 129 from, e.g. the satellites 166A and 166B. At 410, the process stores data representative of the multiple carrier signals received at 400 in a data buffer. The data buffer can be an exclusively allocated range of storage addresses in a computer readable medium or a set of computer readable media. For example, the data buffer may be located in the memory 130 of the telematics unit 114 of the vehicle or may be located in an electronic storage medium located locally at the satellite navigation component 132. Implementations of the invention contemplate that the process may store raw data representative of the carrier signals received at 400. Alternative implementations contemplate that the process stores data representative of characteristics of the one or more carrier signals received at 400. At 410, the process may store any of the types of data stored by the process depicted in FIG. 3 (or variations thereof) at 310 or at 350. Some implementations contemplate that the process returns to 400 after 410 and does not proceed to step 420 until some condition, such as the passage of a threshold amount of time or the storage of a threshold amount of data, occurs.

At 420, the process determines if a carrier phase (CP) reset condition has been satisfied. In various implementations, the CP reset condition may be satisfied by a CP reset of a single satellite, i.e. a "cycle slip" (which occurs when the telematics unit 114 loses a connection with the satellite), by a threshold number of cycle slips occurring within a threshold number of process iterations, or by the exceeding of a threshold value related to one or more CP related data sets. The CP reset condition may also be satisfied if the process determines that a new set of pseudorange measurements are determined (e.g. by the process including 300 through 330). Determining that a CP reset has occurred can involve identifying a discontinuity in a set of data points that each represent a CP value. Implementations contemplate determining that a CP discontinuity has occurred by determining that an absolute difference between CP values measured from consecutive carrier signals received from a single satellite exceeds a threshold value. Alternative implementations contemplate determining that a CP discontinuity has occurred by determining that a percent difference between CP values measured from consecutive carrier signals received from a single satellite exceeds a threshold value or that the time difference corresponding to reception of consecutive carrier signals received from a single satellite exceeds a threshold. If the process determines that the CP reset condition is satisfied, the process proceeds to 440. Alternatively, if the process determines that the CP reset condition is not satisfied, the process proceeds to 430.

At 430, the process determines if a data set limit has been reached. In various implementations, a data set limit has been reached if any data set limit condition from a set of data set limit conditions is satisfied or if certain combinations of data set limit conditions from a set of data set limit conditions are satisfied. In some implementations, the order of the evaluation of conditions represented at 420 and 430 can be reversed. The set of data set limit conditions may include one or more conditions from a group of conditions that includes but is not limited to the reception of a threshold number of carrier signals from a single satellite, the reception of a threshold number of carrier signals from a group of satellites of a particular size, and storing an amount of data representative of carrier signal characteristics that exceeds a threshold memory size. If the process determines that the data set limit has been reached, the process proceeds to 440. Alternatively, if the process determines that the data set limit has not been reached, the process returns to 400.

At 440, the process determines one or more road grade estimates from the data stored in the data buffer at 410 by averaging the road grades determined utilizing the routines described by the process depicted in FIG. 3 at 370 for each of a group of times j, j+1, j+2, j+3, etc. Implementations contemplate that each composite road grade estimates determined at 440 may correspond to a segment of data points stored at the data buffer at 410. The global set of data points stored at the data buffer can be divided into segments where each segment is classified by any of a group including a time interval of a particular duration, a time interval during which a particular number of carrier signals were received from a single satellite, a time interval during which a particular number of carrier signals were received from a plurality of satellites, a road segment, a particular positional increment as determined from increments in latitudinal and longitudinal positions, and a particular altitude increment. Therefore, the process depicted in FIG. 4 can include segmentation of data stored at the data buffer prior to the determination of composite road grade estimates at 440. At 450, the process stores data representative of the road grade estimates determined at 440. Implementations contemplate that the process stores road grade estimates at the memory 130 of the telematics unit 114 of the vehicle 102. Implementations of the invention also contemplate that the process may store data representative of a correspondence between the road grade estimates determined at 440 and one or more road segments.

At 460 the process determines if a vehicle operation modification trigger condition has satisfied. Implementations contemplate that a vehicle operation modification trigger condition can be satisfied if a road grade determined at 440 or stored at 450 exceeds a threshold. Vehicle operation modification triggers may request that a traction control system (TCS) or a brake control module (BCM) enter a particular mode, may request that the transmission be locked into a particular gear, or may request that an automatic shift schedule be implemented.

If the process determines that a vehicle operation modification trigger condition is not satisfied, the process proceeds to 480. However, if the process determines that a vehicle operation modification trigger condition is satisfied, the process proceeds to 470. At 470, the process transmits a vehicle operation modification trigger signal, e.g. through the bus 122. Thereafter, the process proceeds to 480.

At 480 the process clears data stored in the data buffer at which the data is stored at 410. Thereafter the process returns to 400. Some implementations contemplate that the data buffer is cleared at 480 only if the process reaches 480 by virtue of determining that a data set limit has been reached.

Figure 5:
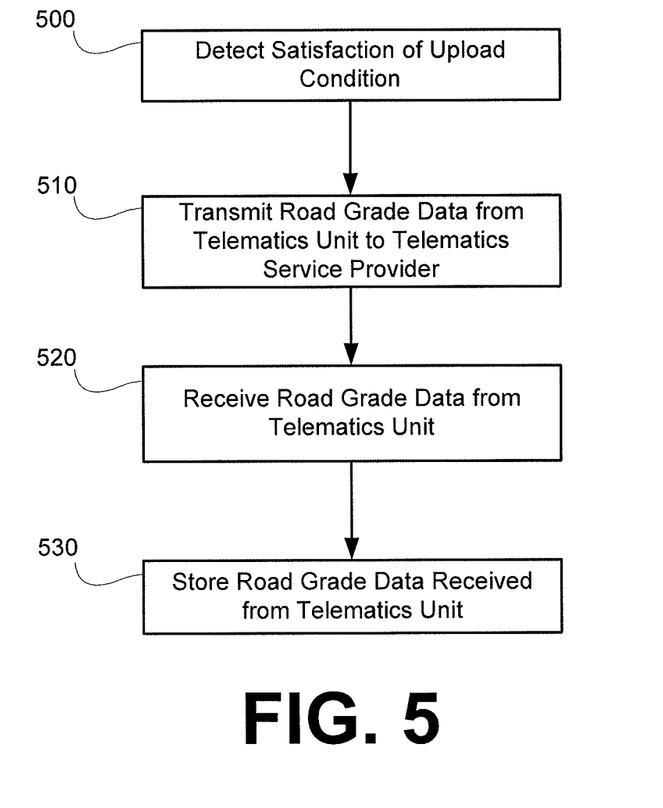
FIG. 5 is flow diagram illustrating a process for uploading road grade information corresponding to a road segment from a telematics unit to a telematics service provider.

FIG. 5 is flow diagram illustrating an alternative process for uploading road grade information corresponding to a road segment from a telematics unit to a telematics service provider. At 500, the process detects that an upload condition is satisfied. In various implementations, the upload condition may be satisfied as a result of a threshold amount of data representative of gradients of road segments is accumulated at the vehicle 102. In alternative implementations, the upload condition may be satisfied by the receipt of a data upload request at the vehicle 102 from the OCC 108 or by the passage of a threshold amount of time since a prior data upload condition was satisfied.

At 510, the vehicle 102 transmits data pertaining to the gradient of one or more road segments to the OCC 108. The data pertaining to the gradient of the one or more road segments may be stored at the electronic storage media 130 of the vehicle 102 or may be stored at an electronic storage medium located locally at the satellite navigation component 132 of the vehicle 102. The data pertaining to the gradient of the one or more road segments is sent by the telematics unit 114 of the vehicle 102 via the multi-mode antenna 129. At 520, the OCC 108 receives the data pertaining to the gradients of one or more road segments from the vehicle 102. At 530, the OCC 108 stores the received data at, e.g., the databases 146.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit 114 may be carried out according to stored recommendations or applications installed on the telematics unit 114, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for determining a gradient of a road segment traversed by a vehicle from a first time to a second time, the method comprising:

receiving, by a transceiver located at the vehicle during a first epoch, at least four first carrier signals each transmitted by one of at least four satellite navigation system satellites;

measuring a carrier phase (CP) of each of the at least four first carrier signals;

storing the measured CP of each of the at least four carrier signals at processor readable media;

receiving, by the transceiver during a second epoch, at least four second carrier signals each transmitted by one of the at least four satellite navigation system satellites;

measuring a CP of each of the at least four second carrier signal;

determining, for each of the at least four satellite navigation system satellites, a difference in the measured CP of the first carrier signal and the measured CP of the second carrier signal, providing, as an input into a change in carrier phase equation for each of the at least four satellite navigation system satellites, the difference in the measured CP of the first carrier signal and the measured CP of the second carrier signal for each of the at least four satellite navigation system satellites;

obtaining a solution representing a change in location coordinates from the first epoch to the second epoch by solving a system of equations including the change in carrier phase equation for each of the at least four satellite navigation system satellites; and determining the gradient of the road segment from the solution.

2. The method of claim 1, further comprising:

receiving, by the transceiver during the first epoch, at least four first psuedorange estimation signals, reading, from the at least four first pseudorange estimation signals, transmit times at which each of the at least four first psuedorange estimation signals were transmitted;

determining, by a processor located at the vehicle, receive times at which each of the at least four first psuedorange estimation signals were received;

storing, at the processor readable media, a transmit time and a receive tune for each of the at least four first pseudorange estimation signals;

providing the transmit time and the receive time for each of the at least four first pseudorange estimation signals as an input into at least four first pseudorange equations corresponding to the at least four satellite navigation satellites; and obtaining a solution representing location coordinates of the vehicle during the first epoch by solving a system of equations that includes the at least four first pseudorange equations.

3. The method of claim 2, further comprising:

receiving, by the transceiver during the second epoch, at least four second psuedorange estimation signals, reading, from the at least four second pseudorange estimation signals, transmit times at which each of the at least four second psuedorange estimation signals were transmitted;

determining, by a processor located at the vehicle, receive times at which each of the at least four second psuedorange estimation signals were received;

storing, at the processor readable media, a transmit time and a receive time for each of the at least four second pseudorange estimation signals;

providing the transmit time and the receive time for each of the at least four second pseudorange estimation signals as an input into at least four second pseudorange equations corresponding to the at least four satellite navigation satellites; and obtaining a solution representing location coordinates of the vehicle during the second epoch by solving a system of equations that includes the at least four second pseudorange equations.

4. The method of claim 1, wherein each change in carrier phase equation corresponding to each of the at least four satellite navigation system satellites relates a change in the measured value of the carrier phase at the first time and the second time to a change in the geographic position of the vehicle from the first time to the second time.

5. The method of claim 3, wherein each of the at least four first pseudorange equations corresponding to the at least four satellite navigation system satellites and each of the at least four second pseudorange equations corresponding to the at least four satellite navigation system satellites relates a difference between a transmit time and a receive time to a geographic position of the vehicle.

6. The method of claim 3, wherein the solution representing location coordinates of the vehicle at the first time and the solution representing location coordinates of the vehicle at the second time are utilized to estimate a change in the error, from the first time to the second time, of a clock utilized to determine receive times of the first carrier signals and the second carrier signals.

7. The method of claim 6, Wherein the estimated change in the error, from the first time to the second time, of the clock utilized to determine receive times of the first and second carrier signals is provided as an input into each of the change in carrier phase equations corresponding to each of the at least four satellite navigation system satellites.

8. The method of claim 1, wherein the transceiver maintains a continuous connection with each of the at least four satellite navigation system satellites from the first time to the second time.

9. The method of claim 1, further comprising:

receiving, by a transceiver located at the vehicle at a first time, at least four third carrier signals each transmitted by one of the at least four satellite navigation system satellites;

measuring a carrier phase (CP) of each of the at least four third carrier signals;

storing the measured CP of each of the at least four third carrier signals at processor readable media;

determining, for each of the at least four satellite navigation system satellites, a difference in the measure CP of the second carrier signal and the measured CP of the third carrier signal, providing the difference in the measure of the CP of the second carrier signal and measure of the third carrier signal for each of the at least four satellite navigation system satellites as an input into a change in carrier phase equation corresponding to each of the at least four satellite navigation system satellites;

obtaining a solution representing a change in location coordinates from the second time to the third time by solving a system of equations created from the equations corresponding to each of the at least four satellite navigation system satellites;

determining the gradient of a road segment traversed by the vehicle from the second time to the third time from the solution representing the change in location coordinates from the second time to the third time, and determining the gradient of a road segment traversed by the vehicle from the first time to the third time by calculating the average of the gradient of the road segment traversed by the vehicle from the first time to the second time and the gradient of the road segment traversed by the vehicle from the second time to the third time.

10. A computer readable electronic storage medium, having stored thereon instructions for determining a gradient of a road segment traversed by a vehicle, the instructions providing for:

receiving, by a transceiver located at the vehicle during a first epoch, at least four first carrier signals each transmitted by one of at least four satellite navigation system satellites;

measuring a carrier phase (CP) of each of the at least four first carrier signals;

storing the measured CP of each of the at least four carrier signals at processor readable media;

receiving, by the transceiver during a second epoch, at least four second carrier signals each transmitted by one of the at least four satellite navigation system satellites;

measuring a CP of each of the at least four second carrier signal;

determining, for each of the at least four satellite navigation system satellites, a difference in the measured CP of the first carrier signal and the measured CP of the second carrier signal, providing, as an input into a change in carrier phase equation for each of the at least four satellite navigation system satellites, the difference in the measured CP of the first carrier signal and the measured CP of the second carrier signal for each of the at least four satellite navigation system satellites;

obtaining a solution representing a change in location coordinates from the first epoch to the second epoch by solving a system of equations including the change in carrier phase equation for each of the at least four satellite navigation system satellites; and determining the gradient of the road segment from the solution.

11. The computer readable electronic storage medium of claim 10, the instructions further providing for:

receiving, by the transceiver during the first epoch, at least four first psuedorange estimation signals, reading, from the at least four first pseudorange estimation signals, transmit times at which each of the at least four first psuedorange estimation signals were transmitted;

determining, by a processor located at the vehicle, receive times at which each of the at least four first psuedorange estimation signals were received;

storing, at the processor readable media, a transmit time and a receive time for each of the at least four first pseudorange estimation signals;

providing the transmit time and the receive time for each of the at least four first pseudorange estimation signals as an input into at least four first pseudorange equations corresponding to the at least four satellite navigation satellites; and obtaining a solution representing location coordinates of the vehicle during the first epoch by solving a system of equations that includes the at least four first pseudorange equations.

12. The computer readable electronic storage medium of claim 11, the instructions further providing for:

receiving, by the transceiver during the second epoch, at least four second pusedorange estimation signals, reading, from the at least four second pseudorange estimation signals, transmit times at which each of the at least four second psuedorange estimation signals were transmitted;

determining, by a processor located at the vehicle, receive times at which each of the at least four second psuedorange estimation signals were received;

storing, at the processor readable media, a transmit time and a receive time for each of the at least four second pseudorange estimation signals;

providing the transmit time and the receive time for each of the at least four second pseudorange estimation signals as an input into at least four second pseudorange equations corresponding to the at least four satellite navigation satellites; and obtaining a solution representing location coordinates of the vehicle during the second epoch by solving a system of equations that includes the at least four second pseudorange equations.

13. The computer readable electronic storage medium of claim 10, wherein each change in carrier phase equation corresponding to each of the at least four satellite navigation system satellites relates a change in the measured value of the carrier phase at the first time and the second time to a change in the geographic position of the vehicle from the first time to the second time.

14. The computer readable electronic storage medium of claim 12, wherein each of the at least four first pseudorange equations corresponding to the at least four satellite navigation system satellites and each of the at least four second pseudorange equations corresponding to the at least four satellite navigation system satellites relates a difference between a transmit time and a receive time to a geographic position of the vehicle.

15. The computer readable electronic storage medium of claim 12, wherein the solution representing location coordinates of the vehicle at the first time and the solution representing location coordinates of the vehicle at the second time are utilized to estimate a change in the error, from the first time to the second time, of a clock utilized to determine receive times of the first carrier signals and the second carrier signals.

16. The computer readable electronic storage medium of claim 15, wherein the estimated change in the error, from the first time to the second time, of the clock utilized to determine receive times of the first and second carrier signals is provided as an input into each of the change in carrier phase equations corresponding to each of the at least four satellite navigation system satellites.

17. The computer readable electronic storage medium of claim 10, wherein the transceiver maintains a continuous connection with each of the at least four satellite navigation system satellites from the first time to the second time.

18. The computer readable electronic storage medium of claim 10, the instructions further providing for:

receiving, by a transceiver located at the vehicle at a first time, at least four third carrier signals each transmitted by one of the at least four satellite navigation system satellites;

measuring a carrier phase (CP) of each of the at least four third carrier signals;

storing the measured CP of each of the at least four third carrier signals at processor readable media;

determining, for each of the at least four satellite navigation system satellites, a difference in the measure CP of the second carrier signal and the measured CP of the third carrier signal, providing the difference in the measure of the CP of the second carrier signal and measure of the third carrier signal for each of the at least four satellite navigation system satellites as an input into a change in carrier phase equation corresponding to each of the at least four satellite navigation system satellites;

obtaining a solution representing a change in location coordinates from the second time to the third time by solving a system of equations created from the equations corresponding to each of the at least four satellite navigation system satellites;

determining the gradient of a road segment traversed by the vehicle from the second time to the third time from the solution representing the change in location coordinates from the second time to the third time, and determining the gradient of a road segment traversed by the vehicle from the first time to the third time by calculating the average of the gradient of the road segment traversed by the vehicle from the first time to the second time and the gradient of the road segment traversed by the vehicle from the second time to the third time.

19. A system for determining the gradient of a road traversed by a vehicle from a first time to a second time, the system comprising:

a receiver, configured to:
receive at least four first carrier signals each transmitted by one of at least four satellite navigation system satellites, and
receive at least four second carrier signals each transmitted by one of the at least four satellite navigation system satellites;

a processor readable memory, configured to:
store a measured carrier phase (CP) value of each of the at least four first carrier signals, and
store a measured CP value of each of the at least four second carrier signals; and a processor, configured to:
measure a CP of each of the at least four first carrier signals,
measure a CP of each of the at least four second carrier signal, determine, for each of the at least four satellite navigation system satellites, a difference in the measure CP of the first carrier signal and the measured CP of the second carrier signal, provide the difference in the measure of the CP of the first carrier signal and measure of the second carrier signal for each of the at least four satellite navigation system satellites as an input into a change in carrier phase equation corresponding to each of the at least four satellite navigation system satellites, obtain a solution representing a change in location coordinates from the first time to the second time by solving a system of equations created from the equations corresponding to each of the at least four satellite navigation system satellites, and determine the gradient of the road segment from the solution representing the change in location coordinates from the first time to the second time.

20. The system of claim 19, the system further comprising:

a transceiver, configured to maintain a continuous connection with each of the at least four satellite navigation system satellites from the first time to the second time.

* * * * *